Nov. 6, 1945.   A. K. LYLE   2,388,274
METHOD OF AND APPARATUS FOR MAKING GLASS
Filed June 4, 1941
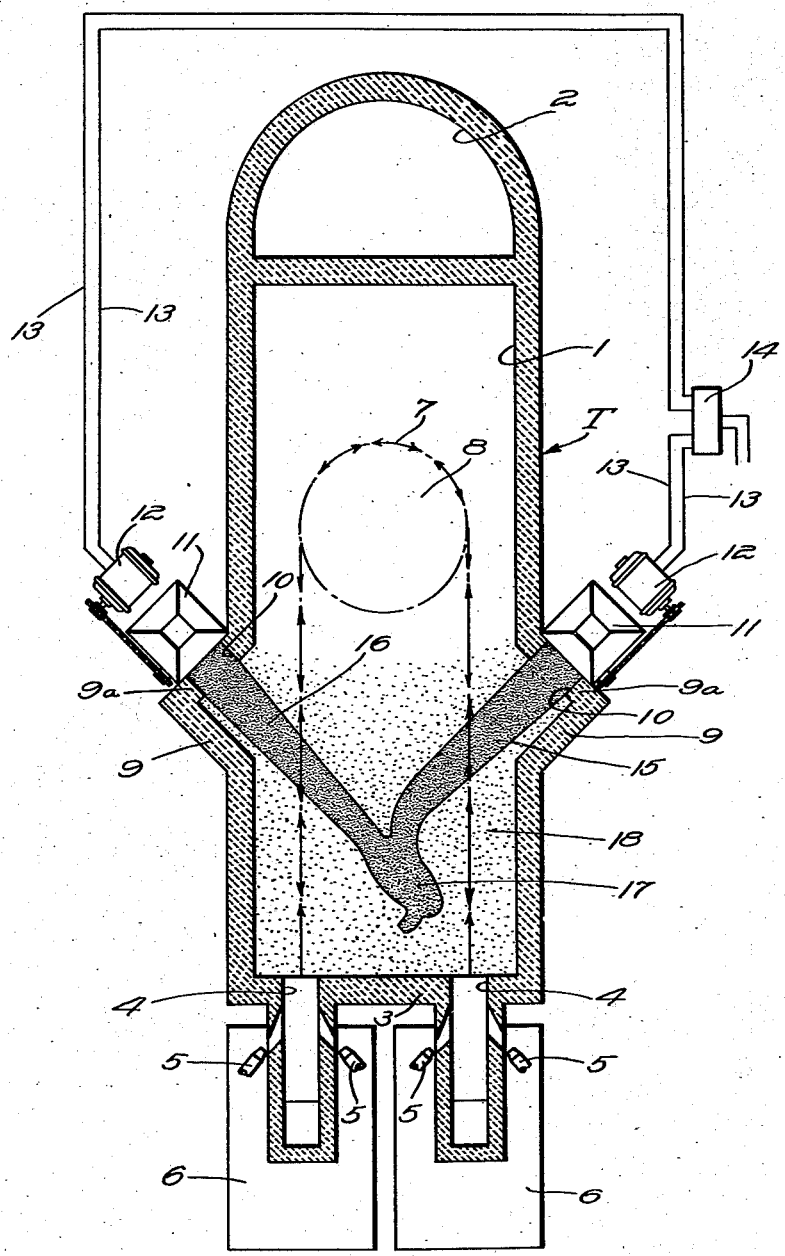

Patented Nov. 6, 1945

2,388,274

UNITED STATES PATENT OFFICE 2,388,274

METHOD OF AND APPARATUS FOR MAKING GLASS

Aaron K. Lyle, West Hartford, Conn., assignor to Hartford-Empire Company, Hartford, Conn., a corporation of Delaware Application June 4, 1941, Serial No. 396,555

10 Claims. (Cl. 49—54)

This invention relates to methods of and apparatus for making glass and more particularly to the feeding of batch to continuous glass melting furnaces.

The invention is especially applicable to furnaces which structurally are not adapted to be equipped at their rear ends with batch feeding apparatus and equipment. Furnaces of this general description may be termed "end-port" furnaces because most, if not all, of them have ports in their rear end walls for supplying combustion-supporting air to and removing spent gases and products of combustion from the furnace. These ports together with the connected system of checkers, flues, etc., of a regenerator or heat exchanger for the furnace take up too much of the space available at the rear of the furnace to permit suitable batch feeding apparatus also to be provided and satisfactorily operated at that place. Some of such "end-port" furnaces are also end-fired while the burners of others are arranged to fire through ports which are located in the side walls of the furnace adjacent to the rear end wall thereof.

It heretofore has been customary in making glass in an "end-port" furnace to feed the batch into the melting section of the furnace laterally through one of the side walls thereof adjacent to the rear or firing end of the furnace. This method of feeding batch to the furnace and apparatus employed for that purpose have important defects or shortcomings, among which may be mentioned a strong tendency for the batch fed into the furnace to move in a continuous stream along a side wall of the furnace so that unmelted batch is distributed unevenly and is at times pulled too far toward the front of the furnace, particularly when the furnace is under a heavy pull. This may impair the quality of the glass produced and prevent desirable uniformity thereof.

An object of the present invention is to obviate or avoid the above specifically mentioned and other defects and shortcomings of prior methods of and apparatus for making glass in an "end-port" continuous furnace.

A further object of the invention is to provide a novel method of feeding batch to the melting section of an "end-port" furnace so as to effect a distribution of the batch in the melting section of the furnace adapted to overcome the tendency of batch to move along a side wall of the furnace toward the front of such furnace.

A further object of the invention is to provide for the feeding of batch into the melting section of an "end-port" furnace so as to direct the batch toward the rearward portion of the melting section, the batch thus fed to be well distributed.

In carrying out the present invention, I propose to feed batch into the melting section of the furnace through a doghouse located at a side of the melting section or through doghouses located at the opposite sides of the melting section at a substantial distance in advance of the rear or firing wall of the furnace. I further propose to feed batch from such a feeding point into the furnace along a path having a rearward component from the feeding point toward the rear wall of the melting section of the furnace.

Other objects and advantages of the invention will hereinafter be pointed out or will appear from the following description of a practical embodiment of the invention, as shown in the accompanying drawing in which:

The view is a horizontal section of an "end-port" continuous melting furnace equipped with provisions for feeding batch thereto in accordance with the present invention and illustrating conditions within the melting section of the furnace at one stage in the feeding of batch in accordance with a method of such invention.

In the drawing, a continuous tank furnace T includes a melting section 1 and a forward or nose section 2. The rear end wall of the furnace, indicated at 3, is provided at places equi-distant from the longitudinally median line of such furnace with ports 4, each of which functions alternately as a source of supply of preheated air for supporting combustion of fuel from burners, indicated at 5, and as an outlet or exhaust port for the waste gases and products of combustion from the furnace. These ports may communicate with checkers 6 of a reversible regenerative heat exchanging structure. The checkers are shown diagrammatically and the regenerative structure is not further shown but may be of any suitable known type.

Flames and products of combustion from each end port 4, when such port is active for the firing of the furnace, will move forwardly in the furnace for a substantial distance, which may be more than half the length of the melting section, and then will turn and move in a rearward direction to the other port 4. In other words, the continuous path of the flames and products of combustion and the resultant waste gases in the melting section of the furnace may be of a substantially elongate U-shape, as indicated at 7 in the drawing. The zone located within the curved forward portion or bight of this path, indicated at 8, may be said to constitute the "hot spot" of the furnace, being the zone in which the heating or melting action of the heat produced by the action of the burners is greatest on the glass bath within the melting section of the furnace.

In feeding batch to a furnace such as that shown in the drawing, I may provide a pair of doghouses 9 which respectively are located at opposite sides of the melting section at a substantial distance from the rear or firing wall 3 of the furnace. This distance may be such that these doghouses are closer to the "hot spot" 8 than to the rear or firing wall of the furnace although the location of such doghouses may vary considerably with relation to such rear wall and the "hot spot".

The doghouses 9 may be so-called "triangular doghouses," substantially as disclosed in my earlier copending application, Serial No. 306,129, filed November 25, 1939, now Patent No. 2,246,375 granted June 17, 1941, for Method of and apparatus for feeding batch to glass melting furnaces except that each such doghouse is constructed as a part of or in association with a side wall instead of with the rear wall of the furnace and only the substantially vertical side wall of the doghouse, indicated at 9a, which faces the opposite rearward corner portion of the melting section of the furnace need be provided with a batch feed port, such as that indicated at 10. I may provide each doghouse 9 with a suitable batch feeding device, indicated at 11, for feeding batch through the port 10 and the associated doghouse into the melting section of the furnace along a path extending diagonally of such melting section toward the opposite rear corner portion thereof. This batch feeding device may be of any suitable known type or construction although I prefer to use an automatic batch feeder having substantially the construction and mode of operation of that which is disclosed in the Hiller Patent No. 1,941,897, granted January 2, 1934, for Apparatus for feeding batch to glass melting furnaces.

Such automatic batch feeders, if they are provided as aforesaid, may be operated by motors 12, suitably connected with the batch feeders and each in turn operatively connected, as by electric conductors 13, with a suitable control mechanism, diagrammatically indicated at 14. This control mechanism may be any suitable known device for starting and stopping periods of activity of the respective batch feeders in accordance with any predetermined plan for the feeding of batch from such feeders. Such control mechanism may be like that disclosed in my aforesaid copending application, Serial No. 306,129, for operating the respective batch feeders alternately for periods of predetermined duration. Alternatively, a more comprehensive control over the batch feeders may be provided by using a control mechanism such as that which is disclosed in the copending application of Harold W. McIntosh and Albert S. Crandon, Serial No. 381,370, filed March 1, 1941, for Method of and apparatus for making glass, owned by the owner of the present application. This McIntosh and Crandon application discloses a control mechanism for controlling the motors of a pair of batch feeders such as are shown in the drawing of the present application so as to produce in each of successive or repeated cycles predetermined periods of activity and inactivity of each feeder and/or of both feeders, such periods being regulable as to duration and selected as to sequence according to any one of a great many different possible plans of operation.

It also is within the purview of the invention to feed batch by manual action through the doghouses or equivalent structures at the sides of the melting section of the furnace. However, or by what means such feeding may be effected, it is an important feature of the invention that the batch introduced into the furnace be directed in a path having a component toward the rear wall of the furnace.

The drawing shows batch feeding according to one way of using the present invention. As shown, the right hand batch feeder, as viewed from the rear end of the furnace, has operated to feed an elongate mass of batch 15 from the right hand doghouse diagonally toward the opposite rear corner portion of the furnace. A generally similar elongate mass of batch 16 has been fed by the other or left hand batch feeder from the left hand doghouse diagonally toward the opposite rear corner portion of the furnace. The convergent batch masses 15 and 16 have been combined or merged at the place at which their paths intersect each other into one rearwardly directed mass 17. The feeding of the batch in the melting section of the furnace thus is always toward the rearward end thereof.

Heat from the bath of molten glass already in the melting section of the furnace and from the combustion of fuel introduced into the furnace by the burners 5 will melt batch from the masses produced by the operations of the batch feeders. Convection currents in the glass bath will tend to break the connected elongate masses into a number of smaller separate floating piles of batch and to move them in a generally rearward direction. These in turn may be broken up into still smaller piles. The stippling in the portion 18 of the melting section of the furnace of the drawing is intended to represent batch in various stages of fusion during the reduction thereof from a raw or nearly raw condition, as when first introduced into the furnace, to completely molten glass of the bath.

The respective batch feeders may be operated according to any one of a great many individually different plans, all within the capabilities of the apparatus shown in the drawing and herein described. The plan to be followed at any given time should be such as to provide desirable distribution of the batch in the melting section of the melting furnace and feeding of the total amount of batch required during each of successive firing periods or any other period of operation of the furnace.

While the invention has been described with relation to the operation of a reversible regenerative "end-port" furnace, it may be used to advantage with furnaces of other types and is susceptible of embodiment in various structures and of being carried out in various ways which are different from those hereinbefore specifically described.

I claim:

1. In the making of glass in a glass melting furnace, the method which comprises feeding batch into said furnace from a feeding point located at one side of said furnace in a direction having a component toward the rear end of said furnace.

2. In the making of glass in a furnace having a melting section extending between a pair of side walls for a substantial distance from a rear end wall of the furnace, the method which comprises feeding batch from a feeding point located at one side of said melting section at a substantial distance from said rear end wall along a line extending diagonally of the melting section from said feeding point toward the opposite rear corner portion of said melting section.

3. In the making of glass in a furnace having a melting section extending between a pair of side walls for a substantial distance from a rear end wall of the furnace, the method which comprises feeding batch from feeding points respectively located at the sides of the melting section at substantial distances from said rear end wall of the furnace along lines extending in the melting section toward the opposite rear corner portions of said melting section.

4. In the making of glass in a furnace having a melting section extending between a pair of side walls for a substantial distance from a rear end wall of the furnace, the method which comprises feeding batch through a doghouse located at one side of the melting section at a substantial distance from said rear end wall of the furnace in an elongate mass extending in the melting section toward the opposite rear corner portion thereof, and feeding batch through a doghouse located at the opposite side of the melting section in an elongate mass directed toward the second rear corner portion of the melting section.

5. The method of feeding batch to a glass melting furnace which comprises feeding batch from feeding points located at opposite sides of the melting section of the furnace at a substantial distance from the rear end wall thereof along two angularly convergent paths which respectively are directed toward the opposite rear corner portions of the melting section of the furnace and which meet and cross each other so that streams of batch fed along said paths will be combined into a rearwardly directed stream at the place of intersection of said paths.

6. The method of feeding batch to a glass melting furnace which comprises feeding batch through a doghouse located at one side of the furnace at a substantial distance from the rearward end of the furnace in an elongate mass extending toward the opposite rear corner portion of the furnace, discontinuing such feeding of batch when the elongate mass of batch has attained the length desired, feeding batch through a second doghouse located at the opposite side of the furnace in an elongate mass extending toward the second rear corner portion of the furnace, discontinuing the feeding of batch through said second named doghouse when the second named elongate mass of batch has attained the length desired, and repeating the said steps in cyclic order.

7. In apparatus for making glass comprising a furnace having firing means at the rear end portion thereof and having a melting section extending between a pair of side walls of the furnace for a substantial part of the length of said furnace, and a doghouse formed in conjunction with one of said side walls at a substantial distance from the rearward end of the melting section of the furnace, and means for feeding batch through said doghouse into said melting section in the direction of the opposite rear corner portion of the furnace.

8. In apparatus for making glass comprising a furnace having a melting section extending between a pair of side walls of the furnace for a substantial part of the length of said furnace, a doghouse formed in conjunction with one of said side walls at a substantial distance from the rearward end of the melting section of the furnace, said doghouse comprising a structure having a batch feed port facing the opposite rear corner portion of the furnace, and means for feeding batch through said port into the melting section of said furnace in an elongate mass extending toward the rear corner portion of the furnace.

9. The combination with a melting furnace having a rear end wall and a pair of substantially parallel side walls, of a pair of doghouses provided in conjunction with said side walls at a substantial distance from said rear end wall, each of said doghouses having a wall facing the opposite rear corner portion of the furnace and provided with a batch feed port, batch feeders associated with said doghouses for feeding batch through said ports along lines respectively extending within the furnace toward the opposite rear corner portions thereof, and means for controlling the operations of said batch feeders.

10. The combination with a melting furnace having a melting section extending from a rear end wall of the furnace between substantially parallel side walls of the furnace for a substantial part of the length of the furnace, said furnace having reversible regenerative firing provisions for projecting flames and products of combustion forwardly in the melting section alternately from right and left hand portions of said rear end wall of the furnace so as to provide a "hot spot" in the melting section of the furnace at a substantial distance from said rear wall, of a pair of doghouses respectively provided in conjunction with the opposite side walls of the furnace at a substantial distance from said rear end wall of the furnace rearwardly of said "hot spot," batch feeders respectively associated with said doghouses for feeding batch through said doghouses along lines respectively extending in the melting section of the furnace toward the opposite rear corner portions thereof, and means for controlling the operations of said batch feeders.

AARON K. LYLE.